3,586,644
ION EXCHANGERS FROM AROMATIC HYDROCARBON POLYMER BY REACTION WITH SULFUR HALIDE FOLLOWED BY OXIDATION OR REDUCTION
Geert Jan de Jong, Boekelo, Netherlands, assignor to N.V. Octrooien Maatschappij "Activit," Amsterdam, Netherlands
No Drawing. Filed Apr. 15, 1969, Ser. No. 816,378
Claims priority, application Netherlands, Apr. 16, 1968, 6805305
Int. Cl. C08f 27/06
U.S. Cl. 260—2.2                                    19 Claims

ABSTRACT OF THE DISCLOSURE

In the production of ion exchange resins, a vinyl aromatic hydrocarbon polymer, preferably a copolymer of styrene and divinylbenzene, is reacted with sulphur halide, such as sulphurmonochloride, so that there is introduced into at least 30% of the aromatic nuclei more than one active group for each nucleus, and the product thus formed is oxidised to provide a strongly acid cation exchanger or reduced to porvide a thiol resin or ion exchanger of the SH type.

---

The invention relates generally to ion exchangers and to the preparation thereof, and, more particularly, to ion exchangers based on copolymers of vinyl aromatic hydrocarbons and divinyl compounds having, on an average, more than one active group per aromatic nucleus.

Numerous methods are known for preparing ion exchangers starting from polystyrene crosslinked with divinyl aromatic compounds. In the preparation of strongly acid cation exchangers from such copolymers, these polymers are, as a rule, sulphonated with $H_2SO_4$, $ClSO_3H$ or $SO_3$. The copolymer matrices, which generally contain between 2 and 30% by weight of divinylbenzene, may in this case be both homogeneous resin gels and also non-homogeneous gels comprising pores. The last-mentioned products may be prepared by copolymerising in the presence of linear polymers, such as linear polystyrene, and extracting the linear polymers out of the copolymers obtained after the polymerisation reaction, or by copolymerising in the presence of agents which are solvents for the monomers and are precipitating agents for the macromolecule. Such precipitation agents are, for example, some of the aliphatic hydrocarbons and a number of alcohols, such as tertiary amyl alcohols.

The sulphonation of all these greatly differing types of copolymers by means of the above identified sulphonation agents generally results in the introduction of only one sulphonyl group per aromatic nucleus. However, sulphonation methods have also been disclosed by which it is possible to introduce more than one $SO_3H$ group per aromatic nucleus (U.S. Pat. No. 2,366,007, Netherlands patent application No. 260330 and Netherlands patent application No. 283400.

It has now been found that, starting from the most widely varying polymer matrices based on vinyl aromatic compounds, which may or may not be crosslinked, it is possible to prepare ion exchangers having, on an average, more than one active group per aromatic nucleus by a method other than the foregoing known methods, and which involves first of all reacting the matrices with sulphurhalides, for example, sulphurchlorides, and subsequently oxidising or reducing.

Using this method according to the invention, it is possible to prepare both ion exchangers of the sulphonic acid type (strongly acid cation exchangers) and also ion exchangers of the SH type (oxidation-reduction resins of the thiol type). In the case of both types, the first step of the method is the same, that is, the reaction of the polymer with sulphur halides to produce sulphides, disulphides and/or polysulphides, of the polymer. As a whole, this first stage may be represented by the reaction formulate: (using by way of example sulphur monochloride and in which R represents the polymer matrix)

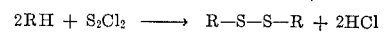
$$2RH + S_2Cl_2 \longrightarrow R-S-S-R + 2HCl$$

and/or

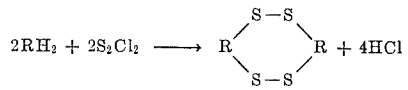

The second stage of the method according to the invention is an oxidation or reduction step. If the second stage is an oxidation step, polymer sulphonic acids (strongly acid cation exchangers) result, whereas a reduction step as the second stage results in thiol resins. The second stage of the method may be represented by the formulae:

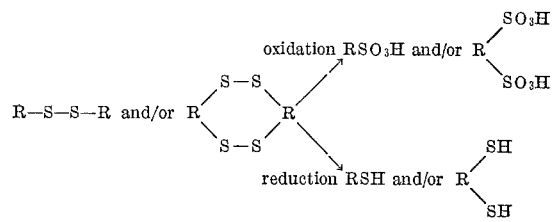

The particular advantage of this method is that, during the reaction with sulphur halides in the first stage, it is possible, in a simple manner, to introduce into the aromatic nuclei of the polymer, on an average, more than one active group per nucleus, whereby ultimately resulting in ion exchangers having more than one ion-exchanging group per aromatic nucleus. With the method, it is found to be possible to introduce, on an average, between 1.3 and 1.5 active groups per phenyl group, that is, 30 to 50% of the aromatic nuclei then contain two active groups. Such ion exchangers are distinguished by an extremely high exchange capacity per volume-unit.

By proceeding from a polymer matrix which is modified during its preparation by copolymerising in the presence of an inert swelling agent for the copolymer, which agent is a solvent for the monomer, modified resins can also be obtained with, on an average, 2 active groups per aromatic nucleus, that is, 100% of the aromatic nuclei contain, on the average, two active groups. Examples of such swelling agents, are toluene, xylene, benzene and chloro-benzene. These modified resins are distinguished by an extremely high exchange capacity per weight-unit, and are particularly suited for use as catalysts in H-ions catalyzed reactions of organic compounds, such as, esterifications, saponifications of esters, condensations (for example, condensation of phenols with ketones) and expoxidations, by reason of their high porosity and their high $H^+$-ion-density per weight-unit. Additionally, the exchangers prepared in accordance with the present method appear to possess properties which make them especially suitable for a number of specific uses, which will be discussed in greater detail at a later point in this specification.

With the method according to the invention, it is possible to proceed from either non-crosslinked or crosslinked polymers of vinyl aromatics. In the case of the crosslinked polymers which may vary quite considerably with regard to their density, that is, with regard to their degree of crosslinking, it is furthermore possible to proceed from either the homogeneous type or the non-homogeneous or porous type. If non-crosslinked polymers of vinyl aromatic substances are used as the starting materials, then these may, optionally, during the present method, be crosslinked with known agents. Examples of aromatic vinyl polymers, from which it is possible to start, are polystyrene, polymers based on vinylbenzenes substituted by alkyl groups in the aromatic nucleus, such as vinyl ethylbenzenes, vinyltoluene, etc., copolymers prepared from styrene or from the above-mentioned vinylbenzenes by copolymerisation with polyalkenic unsaturated compounds, such as divinylbenzene, divinyltoluene, trivinylbenzene, etc., such crosslinking agents being taken up in the copolymer in quantities of 1–25% by weight (in the case of specific porous polymers, even in quantities of more than 25% by weight). It is preferable to start from polystyrene crosslinked with between 2 and 20% by weight of divinylbenzene (DVB).

For the reaction of the polymers with sulphur halides, the following may be used as catalysts: $BF_3$; $FeCl_3$; $AlCl_3$; $H_2SO_4$; $SO_2Cl_2$; $ClSO_3H$; $RSO_2Cl$ or $RSO_3H$, wherein R represents an alkyl group or a phenyl group which may or may not be substituted by alkyl groups; or similar catalysts of the "Lewis acid" type. Of the catalysts of the "Lewis acid" type, chlorosulphonic acid and/or sulphuric acid are preferably used. When using these catalysts, it must also be kept in mind that a small degree of direct sulphonation of the matrix is unavoidable. This causes no difficulty in the preparation of strongly acid cation exchangers. However, in the preparation of the thiol resins, the strongly acid groups resulting from direct sulphonation may give rise to difficulty, in certain applications of the thiol resins. Thus, a metal chloride or, for example, toluene-sulphonic acid, may be used as the catalyst to avoid difficulty due to direct sulphonation of the matrix when producing thiol resins. $BF_3$ as a catalyst involves the difficulty that it is not very soluble in sulphur monochloride, whereas $AlCl_3$ causes a higher degree of chlorination than $H_2SO_4$ and/or $ClSO_3H$.

With regard to the sulphur halides, such as the chlorides or bromides to be employed for the reaction with the polymer, it may be stated that it is not necessary to start from purified products. Thus, when sulphur chloride is chosen the liquids obtained by reacting sufficient chlorine with sulphur powder to achieve approximately the same composition as that of $S_2Cl_2$ have been found to be just as useful as pure sulphur monochloride $S_2Cl_2$ obtained from such liquids by distillation. The undistilled mixtures contain, in addition to $S_2Cl_2$, $SCl_2$ and lower sulphur chlorides such as $S_3Cl_2$ and the like.

In the reaction of the polymers with sulphur chloride, it is a further advantageous circumstance that sulphur chlorides appear to be excellent swelling agents for the copolymers.

Although it is not absolutely necessary to add inert diluents during the condensation reaction, the use of an inert diluent has the advantage that the reaction mixture can be more satisfactorily agitated and the process is thereby more satisfactorily brought "under control," thus achieving more uniform introduction of active groups into the polymers. Suitable inert diluents are liquid $SO_2$, $CS_2$ and diethylether, with liquid $SO_2$ being preferred.

In the first stage of the method, that is, the reaction of the polymer with sulphur chlorides, the following reaction conditions and proportions of reactants should be observed.

For each part by weight of bead-like polymer, between 1.5 and 4 parts by weight, and preferably from 2 to 3 parts by weight, of $S_2Cl_2$ are employed. The polymer is allowed to swell in the sulphur chloride for from 1 to 2 hours at room temperature. For each part by weight of polymer there are then added 1 to 3 parts by weight, preferably 2 parts by weight, of inert diluent. If liquid $SO_2$ is used as the diluent, then the reaction mixture must be cooled to $-10$ to $-15°$ C., unless the reaction proceeds in a closed reactor, under pressure, in which case, in this stage, the reaction mixture may be kept at room temperature.

For each part by weight of polymer, 1 to 5, and preferably 2 to 4, parts by weight of catalyst are added, the temperature meanwhile being maintained at $-10$ to $-15°$ C., or, if work is done in a closed reactor under pressure, the temperature is maintained at 15 to 25° C. Then, the temperature is preferably increased to 50 to 80° C., at which temperature stirring is preferably effected for at least 2 to 3 hours. In the absence of such heating, the reaction is substantially completed in about 24 hours, and the reaction time can be shortened to from 3 to 16 hours by the aforementioned temperature increase to 50 to 80° C. The reaction mixture is finally diluted with water. The polymer beads are separated-off and further processed. Optionally, before such separation, loose sulphur flakes, derived from the excess of sulphur chloride, are removed by backwashing. The polymers thus obtained, which have reacted with sulphur chloride, are then oxidised to polymer sulphonic acids or are reduced to thiol resins.

The oxidation may take place entirely or partially with known oxidation agents, such as $H_2O_2$, $Cl_2$, $HNO_3+O_2$, nitrogen oxides+$O_2$ and the like. The best results are achieved with nitric acid. Preferably, $HNO_3+O_2$ is employed. The oxygen replaces, in that case, a large part of the nitric acid, thereby naturally making this oxidation stage less expensive.

If nitric acid alone is used as the oxidation agent, the oxidation itself is generally also performed in two stages, the first stage (pre-oxidation) taking place with for example 30% of nitric acid at a temperature of 30 to 50° C., and the second stage taking place with 60% of nitric acid at a higher temperature of 80 to 95° C. for 10 to 20 minutes. If nitric acid plus oxygen is employed, then the oxidation is generally effected in an autoclave with 30% of nitric acid, under an oxygen pressure of 3–8 atmospheres, first of all at a temperature of 30 to 40° C., after which the temperature is gradually increased to 90 to 120° C. The total oxidation time is 30 to 60 minutes. The oxidation is concluded at the instant when the oxygen pressure in the autoclave decreases noticeably less rapidly. After oxidation, the beads are washed with water.

The reduction of the beads which have been reacted with sulphur chloride may be effected with sodium sulphide or sodium polysulphide in water. The advantage of this reducing agent is that the beads swell somewhat therein, so that the groups to be reduced are more readily reached by the reducing agent.

The reduction is preferably effected at between 80 and 90° C. The reduction may also be effected with lye, for example soda lye, or with lye to which free sulphur has been added. In the reduction with lye, there are prepared, in addition to thiol groups, sulphinic acid groups, in accordance with the reaction formula:

2R—S—S—R+NaOH→3RSNa+RSO$_2$Na+H$_2$O

Whether this is a source of difficulty depends on the application of the thiol resin. The H form may be obtained from the sodium form of the thiol resin by treating the sodium form with acid.

In those embodiments of the invention in which the polymers are oxidised after the reaction with sulphur halides, products are obtained having exchange capacities 20 to 40% superior to the exchange capacities of the products prepared in accordance with the monosulphonation method conventionally used in the prior art. Additionally, they are also obtained with greater yields per part by weight of the polymer used as the starting product.

Thus, by direct monosulphonation of 1 kg. of bead-shaped styrene copolymer crosslinked with 8% of divinylbenzene of the homogeneous type, approximately 4.0 litres of a strongly acid cation exchanger are obtained, having an exchange capacity in the H+ form of substantially 1900 meq./liter.

On the other hand, the method according to the invention supplies, from 1 kg. of the same copolymer, approximately 5 liters of a cation exchanger having an exchange capacity in the H+ form of 2700 meq./liter. A substantial proportion of thet aromatic nuclei in the macromolecule contains, in this case, two $SO_3H$ groups.

On account of steric hindrance, the degree of introduction of active groups increases proportionally as the content of divinylbenzene in the copolymers is decreased. With a lower content of divinyl compound, the ion exchangers that are obtained swell considerably more in water, thus making it possible to achieve, it is true, higher yields in liters of resin per kg. of copolymer, but not higher exchange capacities per liter of resin, as can be seen from Table A which shows the most significant data with regard to homogeneous copolymers which, according to the present method, have been reacted with sulphur chlorides and subsequently oxidised.

TABLE A

| Number: | Percent DBV in copolymer | Yield in liter of resin/kg. copolymer H+ form | Capacity in meq./g. dry snb-stance H+ form | Capacity in meq./l. resin H+ form, approx. | Yield in meq./kg. copolymer H+ form, approx. |
|---|---|---|---|---|---|
| 1 | 4 | 8.3 | | 2,000 | 16,500 |
| 2 | 6 | 6.1 | 6.7 | 2,600 | 15,800 |
| 3 | 8 | 5.1 | 6.5 | 2,800 | 14,300 |
| 4 | 10 | 4.6 | 6.4 | 2,950 | 13,600 |
| 5 | 12 | 4.2 | 6.1 | 3,100 | 13,000 |
| 6 | 10 | 7.9 | 6.8 | 1,830 | 14,450 |
| 7 | 10 | 5.7 | 6.5 | 2,400 | 13,700 |

The products Nos. 6 and 7 of Table A are exchangers prepared by starting from polymer matrices, which have been obtained by copolymerisation in the presence of toluene as an inert swelling agent. In the case of product No. 6, 80% toluene is present in the monomer mixture; in the case of product No. 7, 40% toluene is present in the monomer mixture. These so-called "expanded" resins exhibit a greater exchange velocity for cations as compared with similar not-expanded products which are more dense. Such highly active, expanded exchangers are particularly suitable for exchange processes with very short contact times. The volume-yields of these products per kg. of copolymer are of course higher than the volume-yields of not-expanded products having the same DVB-content, as is apparent from a comparison of products Nos. 6 and 7 with product No. 4 in Table A.

As has already been clearly explained, the strongly acid cation exchangers prepared in accordance with the present method are especially interesting products, due to their high exchange capacities.

It further has been found that these products have a high selectivity for $Ca^{2+}$-ions as compared with $Na^+$-ions and also a very low selectivity for $Mg^{2+}$-ions as compared with $Na^+$-ions, so that the selectivity for $Ca^{2+}$-ions as compared with $Mg^{2+}$-ions is extremely high. These products are therefore extremely suitable for the decalcification of sea water and particularly suited for calcium/magnesium-separation, for instance in sea water. In the latter case the $Ca^{2+}$-ions are removed with the products of the invention, whereafter magnesium is recovered from the calcium-free solution by precipitation with lye.

The products of the invention have also an increased sodium/hydrogen-selectivity as compared with the Na/H-selectivity of the "monosulphonated" products of the prior art. The selectivity coefficient $S_{Na/H}$ (see the definition under Table B that follows) of the products of the invention is 3.5–4 depending on the DVB-content), whereas the selectivity coefficient of the "monosulphonated" products is only 1.5–2 at the same DVB-content.

The decalcification of sea water is of significance for the preparation of fresh water from sea water by means of flash evaporation, in which process it is important to prevent the formation of boiler scale. Much use has been made of the acidulation of the sea water before evaporation, so that, by eliminating the bicarbonates, at least the formation of calcium carbonate scale is prevented. Since sea water contains approximately 20 meq./l. of $Ca^{++}$, 52 meq./l. of $SO_4$-ions and only ±2 meq./l. of $HCO_3$ ions, acidulation of the sea water before evaporation hardly affects the formation of calcium sulphate containing scale, particularly if the acid used is sulphuric acid, as is generally the case. It has also been proposed to add sequestration agents to the sea water, in order to retain the calcium ions in solution, but these agents are costly and have, furthermore, sometimes the disadvantage that they will not withstand heating of long duration.

Of course, the suitability of cation exchangers for the decalcination of sea water has also been studied. It is known that cation exchangers which contain the carboxyl group as their active function are able to remove calcium ions from sea water, but these ion exchangers can then only be regenerated with the aid of acid, followed by alkali, and such regeneration would be inadmissibly costly. Furthermore, these carboxyl resins absorb large quantities of $Mg^{++}$ ions whereby the capacity for $Ca^{++}$ ions is greatly reduced.

The ideal resin type should be capable of removing mainly calcium ions during the charging phase, while the exhausted exchange material should be capable of being regenerated with the more concentrated salt solution of the flash evaporation process, which normally has to be discharged as waste. In this manner, there would be obtained an ion exchange process the costs of which would be determined mainly by the initial investment required, instead of by the consumption of regeneration agents.

It has been found that the heretofore available type of cation exchanger based on sulphonated copolymers of styrene and divinyl benzene is not sufficiently selective for calcium ions to be capable of decalcifying sufficiently large quantities of sea water. These resins contain at maximum one para-position $SO_3H$ group per styrene molecule. If the exchange capacity per liter is increased by sulphonation with oleum, the decalcifying capacity of the ion exchanger for sea water does, it is true, increase, but without achieving any noteworthy specific decalcifying capacity.

In illustration of the high Ca selectivity of the cation exchangers produced according to the present method, there are set forth in Table B some data relating to these products, together with the corresponding data for known products.

The product No. 1 in Table B is a strongly acid cation exchanger based on polystyrene crosslinked with 9% by weight of divinyl benzene, which contains no more than 1 sulphonic acid group per aromatic nucleus and has an H+ capacity of 2100 meq./l.

The products Nos. 2 and 3 of Table B are cation exchangers based on polystyrene crosslinked with divinyl benzene and are prepared in accordance with the method of Netherlands patent application No. 260,330, that is, they are sulphonated with oleum, so that these products contain, on an average, more than 1 sulphonic acid group per aromatic nucleus. The product No. 2 is crosslinked with 9% by weight of DVB and has an H+ capacity of 2700 meq./l.; the product No. 3 is crosslinked with 14% by weight of DVB and has an $H^+$ capacity of 3150 meq./l.

Products Nos. 4 and 5 are cation exchangers based on the same crosslinked polymers as products Nos. 2 and 3, respectively, and are prepared in accordance with the present method to have an $H^+$ capacity of 2800 and 3000 meq./l., respectively.

TABLE B.—PROPERTIES OF COPOLYMER STYRENE-SULPHONIC ACIDS

| Product No: | A | B | C | D | E | F[1] | G | H[1] |
|---|---|---|---|---|---|---|---|---|
| 1 | 9 | 49 | 5.2 | 2,100 | 2,250 | 7.1 | 15 | 2 |
| 2 | 9 | 52 | 5.9 | 2,700 | 3,000 | 7.5 | 15 | 3.5 |
| 3 | 14 | 59 | 5.4 | 3,150 | 3,500 | 5.4 | 23 | 4 |
| 4 | 9 | 50 | 6.3 | 2,800 | 3,100 | 14.0 | 9.0 | 8 |
| 5 | 14 | 57 | 5.7 | 3,000 | 3,300 | 12.0 | 30 | 9 |

[1] In the presence of 0.5 NaCl.

NOTES:
A=Percent DVB in copolymer matrix.
B=Percent dry substance in $H^+$ form.
C=Capacity in meq./g. dry substance in $H^+$ form.
D=Capacity in meq. per liter in $H^+$ form.
E=Capacity in meq. per liter in $Na^+$ form.
F=Selectivity coefficient (cf. Marinsky, Ion Exchange, page 257, Marcel Dekker Inc., New York, 1966).

$$S_{Ca/Na} = \frac{Ca_R^{++} \cdot Na_W^+}{Ca_W^{++} \cdot Na_R^+}$$

G=Number of vol. sea water (20 meq. $Ca^{2+}$/l.) to $Ca^{2+}$ leakage starting from 100% $Na^+$ charging.
H=Selectivity coefficient $S_{Ca/Mg}$.

Due to their much greater selectivity for the calcium ion, products Nos. 4 and 5 are able to decalcify much more sea water per volume-unit than has hitherto been possible, and said selectivity is precisely such that regeneration of the ion exchanger charged with $Ca^+$ ions can be effected by means of the waste product of the flash evaporation, with an NaCl content of 5 to 10% by weight. In this connection, it should also be pointed out that the percolation of sea water is halted at that percentage of $Ca^{2+}$ leakage (usually lower than 20%) at which a repeatable charging-regeneration cycle is obtained.

Without being bound by the following explanation, the applicant believes that the strikingly increased Ca-selectivity is due to the fact that, in the case of the di-substituted phenyl groups of ion exchangers according to the present method, the substituents are arranged in the ortho-position relatively to each other. In the case of monosulphonation of styrene/DVB copolymer with the conventional sulphonation agents, the active group takes up its position on the 4-place of the phenyl group (with the 1-place being the linkage of the phenyl group with the polymer chain). In the case of sulphonation of a polymer with oleum, for the introduction, on the average, of more than one active group per aromatic nucleus, the second group passes into the 2-place due to the meta-orienting effect of the already available sulphonic acid group, so that predominantly 2-4-disulphonic acids are produced. In the case of the present method, during the introduction of a second active group into an aromatic nucleus there are obtained, as a result of the ortho-para-orienting effect thereby taking place, phenyl groups which are substituted predominantly on the 3-place and 4-place. Thus, it is possible to ascribed the extremely high Ca-selectivity to the sulphonic acid groups coming into being after oxidation and being arranged in the ortho-position relatively to each other.

The thiol resins prepared in accordance with the present method may be used as Redox-exchangers (so-called electron exchangers) and as reduction agents. Furthermore, they have the ability to bind heavy metals at low pH values, and this involves some interesting possible uses in the field of the recovery of costly metals and, for example, the obtaining of uranium from sea water. Also copper can be recovered from 3% hydrochloric acid, and lead and mercury can be recovered from 0.3% hydrochloric acid. These resins are also of interest for therapeutic uses.

A number of illustrative examples of the invention are given below, but it is to be understood that the invention is not limited to these examples. Examples I to V and Example VIII relate to the preparation of strongly acid cation exchangers; Examples VI and VII relate to the preparation of thiol resins.

EXAMPLE I

One part by weight of bead-shaped polystyrene crosslinked with 6% by weight of DVB is caused to swell, at room temperature, in 3 parts by weight of undistilled $S_2Cl_2$.

Then, while cooling to a temperature below 40° C. and stirring for one hour, 3½ parts by weight of 100% $H_2SO_4$ are added. The temperature of the reaction mixture is then allowed to increase and, finally, it is heated during 6 hours to 80° C.

The bead-like elements are drawn off and carefully washed, first of all with 96% technical sulphuric acid, then gradually with increasingly diluted sulphuric acid (10%) and, finally, with water.

Subsequently, the bead-like elements are treated with 5 parts by weight of 60% nitric acid, as the reaction temperature is brought up to 95° C. Oxidation is suspended at the instant when the strong evolution of gas which initially took place is greatly diminished. Transparent, slightly tinted beads are obtained.

For each kg. of crosslinked polystyrene, 6.1 liters of strongly acid cation exchanger in the $H^+$ form, that is, the product No. 2 of Table A above, are obtained.

The yield and the properties of such product obtained are given in connection with product No. 2 in Table A.

EXAMPLE II

One part by weight of bead-shaped polystyrene crosslinked with 10% by weight of DVB was caused to swell with 2 parts by weight of $S_2Cl_2$. The swollen beads were cooled down to $-15°$ C., whereupon 2 parts by weight of liquid $SO_2$ were added. Then, while stirring for one hour, 2½ parts by weight of $ClSO_3H$ were added, meanwhile maintaining the temperature, by cooling, at $-15°$ C.

Thereupon, the reaction mixture was allowed to come up to room temperature and was, finally, heated for 3 hours to 80° C.

The beads were poured into water, with stirring, and subsequently oxidised in an autoclave in the presence of 2 parts by weight of 30% nitric acid with oxygen, under a pressure of 5 atmospheres, and with a temperature increasing slowly to a maximum of 110° C.

When the pressure of the autoclave no longer decreased substantially, which was the case after a time of one hour, the beads were cooled, filtered and washed with water.

4.6 liters of strongly acid cation exchanger were obtained for each kg. of crosslinked polystyrene, with a capacity of 2950 meq./l., as in the case of product No. 4 in Table A.

EXAMPLE III

This example involves the preparation of a strongly acid cation exchanger based on non-homogeneous pore-containing beads of polystyrene, crosslinked with 20% by weight of DVB and which are prepared in accordance with the precipitation method.

A mixture of 33.3 parts by weight of styrene, 16.7 parts by weight of divinylbenzene (DVB) having a content of 60% and 50 parts by weight of n-hexane were suspended, with stirring, in a solution of 1 part by weight of gelatine in 400 parts by weight of water. To the suspension were added 1 part by weight of bentonite and, as a catalyst, 0.5 part by weight of benzoyl peroxide.

The suspension was heated for 20 hours to approximately 70° C. and finally for a further 5 hours at 80° C.

The white, opaque beads obtained were subsequently sieved and washed with a great deal of cold water, and then dried.

One part by weight of the above obtained beads was caused to swell, at room temperature, in 5 parts by weight of $S_2Cl_2$, whereupon dilution was effected with 8 parts by weight of liquid $SO_2$, and the temperature was reduced to —15° C.

Subsequently, 3½ parts by weight of $ClSO_3H$ were slowly added dropwise with stirring. Thereupon, the reaction mixture was allowed to reach room temperature. Over a period of several hours, the temperature was slowly increased to 80° C. Stirring was suspended. After a heating time of 4 hours, the dark, dry beads were washed with concentrated $H_2SO_4$ and then gradually washed acid-free with water.

One part by weight of the beads which were thus reacted with sulphur chloride was subsequently heated, with 2 parts by weight of 30% nitric acid, under an oxygen pressure of 4 atmospheres in an autoclave, accompanied by stirring, and with the temperature being allowed to increase slowly to 90° C.

After a reaction time of 30 minutes, the autoclave pressure, which had been maintained at 4 atmospheres by periodically adding oxygen, ceased to diminish. By washing-out with concentrated $H_2SO_4$ prior to the oxidation step, the decomposition of the excess $S_2Cl_2$ in the bead due to water, accompanied by the forming of elementary S, was prevented, whereby the oxidation reaction was completed at a lower temperature and with a shorter reaction time.

The slightly tinted, opaque beads were finally washed with water.

What was obtained was 5.4 liters of beads per kg. of copolymer, with a liter capacity of 2100 meq./l. in the condition charged with $H^+$ ions.

EXAMPLE IV

This example involves the preparation of a strongly acid cation exchanger based on bead-shaped polystyrene, cross-linked with 16% by weight of DVB, of the non-homogeneous porous type, prepared in accordance with the extraction method.

One part by weight of a bead-shaped copolymer of styrene with 16% by weight of DVB of a non-homogeneous porous type, obtained in accordance with the method as disclosed in Netherlands patent application No. 260,170, and from which 15% by weight of non-crosslinked polystyrene was extracted was caused to swell with 2 parts by weight of $S_2Cl_2$.

The swollen beads were cooled down to —15° C., whereupon 2 parts by weight of liquid $SO_2$ were added. Subsequently, during 1 hour, 2 parts by weight of $ClSO_3H$ were added, the reaction mixture meanwhile being maintained by cooling at —15° C.

Then, the temperature of the reaction mixture was allowed to increase slowly and finally it was heated for 12 hours at 60° C.

The beads were washed with carbon disulphide and vacuum dried until they were air-dry. Then, the material was pre-oxidised during 1 hour with 30% nitric acid at a temperature of between 30 and 50° C. and, finally, it was after-oxidised by heating to 90° C. over a period of 40 minutes with 60% nitric acid.

After cooling, the beads were washed with water. There were obtained 4 liters of beads per kg. of copolymer, with a liter capacity of 3000 meq./l. in the $H^+$ form.

EXAMPLE V

This example involves the preparation of a strongly acid cation exchanger from bead-shaped, non-crosslinked polystyrene.

20 parts by weight of bead-shaped non-crosslinked polystyrene were suspended, with stirring in 80 parts by weight of 100% $H_2SO_4$.

Then, a mixture of 60 parts by weight of $S_2Cl_2$ and 20 parts by weight of chloromethylether ($CH_3OCH_2Cl$) was added. The temperature of the suspension rose slowly and was maintained, with cooling, at 40° C. for a period of 12 hours.

The resulting beads were filtered, washed with concentrated $H_2SO_4$ and, in an autoclave, oxidised with 70 parts by weight of 30% nitric acid, meanwhile adding oxygen, at a pressure of 4 atmospheres and a temperature of 80° C.

After thus oxidizing for 25 minutes, the pressure in the autoclave no longer decreased and the beads were withdrawn from the autoclave and washed with water. There were obtained 9.8 liters of beads per kg. of polymer, with a capacity of 1350 meq./l. ($H^+$ form).

The yields and the liter capacities of the products obtained in Examples III, IV and V are set forth in the table below.

TABLE C

|  | Yield in liter resin/kg. matrix, with $H^+$-charging | Capacity in meq./liter $H^+$-charging |
|---|---|---|
| Example III (20% DVB) | 5.4 | 2,100 |
| Example IV (16% DVB) | 4.0 | 3,000 |
| Example V (0% DVB) | 9.8 | 1,350 |

It should be stated that the exchange capacities indicated above all relate to the $H^+$-charging condition. Since the volume of the exchangers is considerably diminished on charging with metal ions, such as sodium and calcium, in the case of charging wth metal ions, the liter capacity is 10 to 20% higher than the value given for $H^+$-charging.

EXAMPLE VI

This example involves the preparation of a thiol resin from a bead-shaped, homogeneous polystyrene crosslinked with 9% by weight of DVB.

One part by weight of bead-shaped, homogeneous polystyrene crosslinked with 9% by weight of divinylbenzene (DVB) was caused to swell, meanwhile stirring at room temperature, in 2 parts by weight of sulphur chloride. The swollen beads were cooled to —15° C., whereupon two parts by weight of liquid $SO_2$ were added. Then, with stirring, 2½ parts by weight of chlorosulphonic acid were slowly added, with the temperature being meanwhile maintained at —15° C. by cooling.

The reaction mixture was then brought to room temperature and finally heated for 8 hours to 60° C.

After cooling to room temperature, the reaction mixture was slowly diluted with water (with stirring) and finally the beads were separated off and washed with water. The bead-shaped polystyrene sulphides thus obtained exhibited, on analysis, a salt-fission capacity of approximately 300 to 400 meq./liter. The beads were subsequently heated for 2 hours with 3% NaOH to a temperature of 90° C., and then washed with water.

After regeneration with diluted hydrochloric acid and acid-free washing with water, the product was analysed. The fission capacity for NaCl then amounted to 520 meq./liter, while it was still possible to absorb 1500 meq. NaOH/liter of beads.

The S-content in the dry condition was approximately 20% by weight.

EXAMPLE VII

This example involves the preparation of a thiol resin based on bead-shaped, non-homogeneous polystyrene crosslinked with 8% DVB.

One part by weight of bead-shaped copolymer of styrene and 8% by weight of divinylbenzene obtained in porous form by polymerisation in the presence of approximately 20% by weight of a linear polystyrene and subsequent extraction of the linear polystyrene once again with clorobenzene, was induced to swell in 3 parts by weight of undistilled sulphur chloride containing 46% sulphur.

Subsequently, 3 parts by weight of 98% $H_2SO_4$ were slowly added, the temperature being meanwhile held below 35° C. by cooling. The reaction mixture was allowed to stand for 24 hours and thereupon the beads were poured, accompanied by vigorous stirring, out into a large excess of cold water. By reflux, the sulphonated beads were freed from loose sulphur flakes.

Then, reduction was effected by heating the beads with 4 parts by weight of $Na_2S \cdot 9H_2O$, for 8 hours to 90° C.

The beads thus obtained were put in the SH form with diluted HCl and, after washing with water, analysed.

The product contained 250 meq./l. of strongly acid groups and 2000 meq./l. of SH groups.

EXAMPLE VIII

This example involves the preparation of a so-called "expanded" strongly acid cation exchanger based on styrene-divinylbenzene copolymer.

One part by weight of bead-shaped copolymer obtained by copolymerising of styrene and 10% by weight of divinyl-benzene in the presence of 80% by weight of toluene with respect to the weight of the monomer mixture, was caused to swell with 2.4 parts by weight of $S_2Cl_2$.

The swollen beads were cooled down to −15° C., whereupon 3 parts by weight of liquid $SO_2$ were added. Subsequently, during 1 hour, 2.6 parts by weight of chlorosulphonic acid were added gradually, the reaction mixture meanwhile being maintained by cooling at −15° C.

Then, the temperature of the reaction mixture was allowed to increase slowly to 70° C. and finally it was heated for 16 hours at 70° C.

After cooling down of the reaction mixture to room temperature, 96% $H_2SO_4$ was added slowly while stirring, whereafter cold water was added slowly. After washing, the beads were separated off and oxidised with 90% $HNO_3$.

A bead-shaped strongly acidic cation exchanger was obtained in a yield of 7.9 liters per kg. polymer, and is the product identified as No. 6 on Table A.

As previously noted, sulphur bromides may be used in place of the sulphur chlorides in the initial or sulphurizing step of the foregoing examples. However, the use of sulphur bromides results in ion exchange resins having lower capacities than are obtained when sulphur chlorides are employed. This is probably due to the fact that the sulphur bromides are not as effective as the sulphur chlorides as swelling agents for crosslinked polymers. Further, when sulphur bromides are used the degree of direct sulphonation is relatively increased to an extent that may be disadvantageous, particularly in the production of thiol resins. Thus, in most cases, the use of sulphur chlorides is preferred.

What is claimed is:

1. The method of producing ion exchange resins, comprising the steps of reacting a sulphur halide selected from the group consisting of sulphur monochloride and mixtures of sulphur chlorides with a copolymer of styrene and divinylbenzene containing from 2 to 20% by weight of the latter, the amount of said sulphur halide being from 1.5 to 4 parts thereof, by weight, for each part of said copolymer, the reaction of said sulphur halide with said copolymer being effected in the presence of from 1 to 5 parts, by weight, of a catalyst for each part of said copolymer, said catalyst being selected from the group consisting of sulphuric acid, chlorosulphonic acid and compounds of the Lewis acid type, and, upon the substantial completion of the reaction to introduce into the aromatic nuclei of said copolymer an average of more than one active group for each of said nuclei, oxidizing the product thus obtained to provide a correspondingly strongly acid cation exchanger.

2. The method of claim 1, in which the reaction of the sulphur halide with the copolymer is effected in an inert diluent selected from the group consisting of carbon disulphide, liquid $SO_2$ and diethylether.

3. The method of claim 2, in which 1 to 3 parts by weight of said inert diluent are present for each part of said copolymer.

4. The method of claim 1, in which the completion of the reaction of the sulphur halide with the copolymer is accelerated by the heating thereof to a temperature in the range of about 50 to 80° C. for from approximately 3 to 16 hours.

5. The method of claim 4, in which the reaction is further promoted by stirring the reaction mixture for from 2 to 3 hours at the commencement of the heating thereof.

6. The method of claim 1, in which said oxidizing of the reaction product is effected with nitric acid.

7. The method of claim 6, in which the oxidation with nitric acid is effected in the presence of a gaseous substance selected from the group consisting of oxygen and an oxygen containing gas.

8. The method of claim 6, in which the oxidation with nitric acid is performed in a first stage at 30 to 50° C. and in a second stage at 80 to 95° C. and with a relatively higher nitric acid concentration in said second stage than in said first stage.

9. The method of claim 1, in which said oxidizing of the reaction product is effected with oxygen in the presence of nitrogen oxides.

10. The method of claim 1, in which said oxidizing of the reaction product is effected with an oxidizing agent selected from the group consisting of nitric acid and nitrogen oxides, in an autoclave under an oxygen pressure of 3 to 8 atmospheres first at a temperature of 30 to 40° C. and then at a temperature gradually increased to 90 to 120° C.

11. An ion exchange resin produced by the method according to claim 1.

12. The method of producing ion exchange resins, comprising the steps of reacting a sulphur halide selected from the group consisting of sulphur monochloride and mixtures of sulphur chlorides with a copolymer of styrene and divinylbenzene containing from 2 to 20% by weight of the latter, the amount of said sulphur halide being from 1.5 to 4 parts thereof, by weight, for each part of said copolymer, the reaction of said sulphur halide with said copolymer being effected in the presence of from 1 to 5 parts, by weight, of a catalyst for each part of said copolymer, said catalyst being selected from the group consisting of sulphuric acid, chlorosulphonic acid and compounds of the Lewis acid type, and, upon the substantial completion of the reaction to introduce into the aromatic nuclei of said copolymer an average of more than one active group for each of said nuclei, reducing the reaction product thus obtained to provide a corresponding ion exchanger of the SH type.

13. The method of claim 12, in which the reaction of the sulphur halide with the copolymer is effected in an inert diluent selected from the group consisting of carbon disulphide, liquid $SO_2$ and diethylether.

14. The method of claim 12, in which 1 to 3 parts by weight of said inert diluent are present for each part of said copolymer.

15. The method of claim 12, in which the completion of the reaction of the sulphur halide with the copolymer is accelerated by the heating thereof to a temperature in the range of about 50 to 80° C. for from approximately 3 to 16 hours.

16. The method of claim 12, in which the reaction is further promoted by stirring the reaction mixture for from 2 to 3 hours at the commencement of the heating thereof.

17. The method of claim 12, in which said reducing of the reaction product is effected by an excess of sodium sulphide so that said reaction product is reduced to a thiol resin.

18. The method of claim 12, in which said reducing of the reaction product is effected with soda lye so as to reduce said reaction product to a thiol resin.

19. An ion exchange resin produced by the method according to claim 12.

References Cited

UNITED STATES PATENTS

| | | | |
|---|---|---|---|
| 2,366,007 | 12/1944 | D'Alelio | 210—24 |
| 2,891,916 | 6/1959 | Hwa | 260—2.2 |
| 3,044,969 | 7/1962 | Seifert | 260—2.2 |
| 3,128,257 | 4/1964 | Hoover et al. | 260—2.2 |
| 3,172,916 | 3/1965 | Wagner | 260—619 |

FOREIGN PATENTS 636,634  11/1963  Belgium.

WILLIAM H. SHORT, Primary Examiner

M. GOLDSTEIN, Assistant Examiner

U.S. Cl. X.R.

260—79.3, 79.5